United States Patent
Offenbacher et al.

(10) Patent No.: US 10,655,051 B2
(45) Date of Patent: May 19, 2020

(54) USE OF PARTICULATE OR FIBROUS MATERIALS IN GRAVEL PACK APPLICATIONS

(71) Applicant: M-I L.L.C., Houston, TX (US)

(72) Inventors: Matthew Offenbacher, Houston, TX (US); Balkrishna Gadiyar, Katy, TX (US)

(73) Assignee: M-I L.L.C., Houston, TX (US)

( * ) Notice: Subject to any disclaimer, the term of this patent is extended or adjusted under 35 U.S.C. 154(b) by 307 days.

(21) Appl. No.: 15/128,998

(22) PCT Filed: Mar. 26, 2015

(86) PCT No.: PCT/US2015/022766
§ 371 (c)(1),
(2) Date: Sep. 26, 2016

(87) PCT Pub. No.: WO2015/148811
PCT Pub. Date: Oct. 1, 2015

(65) Prior Publication Data
US 2017/0190948 A1  Jul. 6, 2017

Related U.S. Application Data

(60) Provisional application No. 61/970,610, filed on Mar. 26, 2014.

(51) Int. Cl.
| | | |
|---|---|---|
| *C09K 8/52* | (2006.01) | |
| *E21B 43/04* | (2006.01) | |
| *C09K 8/035* | (2006.01) | |
| *C09K 8/506* | (2006.01) | |
| *E21B 37/00* | (2006.01) | |
| *E21B 43/08* | (2006.01) | |
| *E21B 21/00* | (2006.01) | |

(52) U.S. Cl.
CPC ............... *C09K 8/52* (2013.01); *C09K 8/035* (2013.01); *C09K 8/506* (2013.01); *E21B 37/00* (2013.01); *E21B 43/04* (2013.01); *E21B 43/08* (2013.01); *C09K 2208/08* (2013.01); *C09K 2208/26* (2013.01); *E21B 21/003* (2013.01)

(58) Field of Classification Search
CPC . C09K 8/68; C09K 8/52; C09K 8/685; C09K 8/90; E21B 43/04; E21B 43/08; E21B 43/267; E21B 37/00; E21B 43/26
See application file for complete search history.

(56) References Cited

U.S. PATENT DOCUMENTS

| | | | |
|---|---|---|---|
| 4,470,915 A | 9/1984 | Conway | |
| 2001/0036905 A1 | 11/2001 | Parlar et al. | |
| 2004/0055747 A1* | 3/2004 | Lee | C09K 8/52 166/278 |
| 2008/0139416 A1* | 6/2008 | Rimassa | C09K 8/508 507/241 |
| 2009/0258798 A1 | 10/2009 | Munoz et al. | |
| 2012/0132421 A1* | 5/2012 | Loiseau | C09K 8/82 166/279 |
| 2013/0213638 A1* | 8/2013 | Keller | C04B 28/02 166/248 |
| 2013/0228335 A1* | 9/2013 | Dobson | E21B 43/25 166/305.1 |

OTHER PUBLICATIONS

International Search Report and Written Opinion regarding corresponding application No. PCT/US2015/022766; 11 pages; dated Jul. 7, 2015.

* cited by examiner

*Primary Examiner* — Zakiya W Bates
(74) *Attorney, Agent, or Firm* — Kimberly Ballew

(57) ABSTRACT

Methods include drilling at least one interval of a wellbore with a water-based wellbore fluid producing a filtercake in the at least one interval of the wellbore. The methods also include gravel packing an interval of a wellbore traversing a subterranean formation with a gravel pack that comprises polyhydroxycarboxylic acid, and hydrolyzing the polyhydroxycarboxylic acid to degrade at least a portion of the filtercake.

14 Claims, No Drawings

USE OF PARTICULATE OR FIBROUS MATERIALS IN GRAVEL PACK APPLICATIONS

This application is a National Stage application of International Application No. PCT/US2015/022766 filed Mar. 26, 2015, which claims the benefit of U.S. Provisional Application No. 61/970,610 filed on Mar. 26, 2014, incorporated by reference herein in its entirety.

BACKGROUND

To produce oil and gas from a hydrocarbon reservoir, a wellbore is first drilled through geological formations. During drilling operations, specially designed reservoir drilling fluids may have various additives, including biologically-derived polymers and bridging solids that lubricate the drill bit and remediate fluid loss into the formation. Drilling fluid additives are often formulated such that formation damage caused by the accumulated drilling fluids may be reversible, because the additives are soluble or breakable upon contact with a suitable breaker fluid, which may include acids, oxidizers, or enzymes, for example.

Once the wellbore is generated in the hydrocarbon reservoir, production tubing and/or screens may be emplaced within the wellbore and placed within an interval of the formation prior to hydrocarbon production. During production, sand control methods and/or devices are used to prevent sand particles in the formation from entering and plugging the production screens and tubes in order extend the life of the well. Sand control methods may include gravel packing in which the annular space between the wellbore and the production screens is filled with specially sized gravel packing sand.

Following drilling operations and prior to introduction of the sand or gravel for the gravel pack, the hydrocarbon-bearing formation may contain a substantially impermeable filtercake created by the reservoir drilling fluid. This thin and impermeable filtercake may prevent the gravel pack fluid from entering the formation, and may result in gravel pack failure. Moreover, after gravel pack emplacement, the filtercake existing between the gravel pack sand and the formation may require removal before the flow of hydrocarbon may be initiated. Without the removal of the filtercake, plugging of the production screen by the filtercake could occur, impairing production.

Various chemicals, breakers, and mechanical devices have been developed to remove filtercakes during gravel packing operations. For example, acids may be delivered to soak the gravel pack sand and filtercake. Here, the goal is to dissolve the acid-soluble and acid-breakable components in the filtercake and remediate the damaged formation.

Other breakers, such as oxidizers and enzymes, may also be delivered to destroy oxidizer- and enzyme-breakable organic components. They may not be as effective in destroying acid-soluble and acid-breakable inorganic components in the filtercake, such as calcium carbonate. As a result, acid-soluble and breakable components may remain behind the gravel pack sand and cause impairment during the production of the well. Secondly, many oxidizing breakers have compatibility issues with certain brines and may react with the brine and create undesirable by-products, such as $Cl_2$ and $Br_2$ gases. This reaction can occur even before the breakers are pumped down to attack the filtercake. Third, in addition to brine compatibility issues, enzyme breakers may also have reduced activity outside of the optimal temperature range for the given enzyme. For example, enzyme breakers may lose reactivity in highly concentrated divalent brines or at temperatures above 93° C. (200° F.).

The above filtercake breakers are often pumped separately after the gravel pack sand has been set. They are not pumped during the gravel pack operation because they can create precarious conditions for the operation. For instance, the acid-based breakers can destroy the filtercake during gravel pack operations, which may result in high fluid loss and premature failure in the gravel pack operation. Similarly, pumping oxidizers and enzyme breakers with gravel pack sand may cause inconsistent application of oxidizers and enzyme breakers to the filtercakes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, methods described herein are directed to drilling at least one interval of a wellbore with a water-based wellbore fluid to produce a filtercake in the at least one interval of the wellbore. The method may also include gravel packing an interval of a wellbore traversing a subterranean formation with a gravel pack that includes polyhydroxycarboxylic acid, and hydrolyzing the polyhydroxycarboxylic acid to degrade at least a portion of the filtercake.

In another aspect, methods described here are directed to running a sand control screen assembly to a selected depth within the uncased section of the wellbore to facilitate a gravel packing operation and introducing a gravel pack slurry that includes polyhydroxycarboxylic acid into the wellbore to facilitate gravel packing operations.

Other aspects and advantages of the disclosure will be apparent from the following description and the appended claims.

DETAILED DESCRIPTION

In one aspect, embodiments disclosed herein relate to wellbore treatments containing filtercake breakers that may be used during operations to clean the wellbore prior to the production of hydrocarbons from a subterranean formation. Filtercake breakers may be applied to filtercakes to aid in their removal, particularly during completions operations such as gravel packing prior to initiation of hydrocarbon production.

Wellbores drilled in certain subterranean formations are sometimes completed as open holes, i.e., without a casing or liner installed therein. Special drilling fluids referred to in the art as "drill-in fluids" may be used to drill such wellbores, among other reasons, to minimize the damage to the permeability of the producing zones or formations. The drill-in fluid may form a filtercake on the walls of the wellbore, which may prevent or reduce fluid loss during drilling, and upon completion of the drilling, may stabilize the wellbore during subsequent completion operations such as placing a gravel pack in the wellbore.

After completion operations in the wellbore have been concluded, filtercake remaining on the walls of the wellbore must be removed. This may be accomplished by contacting the filtercake with an aqueous acid solution. However, the use of an aqueous acid solution may be hazardous to personnel or may cause corrosion on surfaces and/or equipment in the wellbore. In addition, acid solutions may react rapidly at the initial point of contact with the wellbore, which can lead to the creation of fluid loss zones into which acid and other wellbore fluids may be lost. Prematurely spent acid solutions may also leave much of the wellbore untreated and remaining filtercake in place, which can lead to downstream issues and reduced production rates.

In embodiments in accordance with the instant disclosure, a filtercake breaker composition may be employed for in place of aqueous acid solutions. In particular embodiments, filtercake breaker compositions may produce acid over time and, in effect, may be less hazardous to personnel. Moreover, because of this time-dependent release of acid, these compounds may be able to flow further into the wellbore before reacting to reduce pH, allowing specific placement of the compositions into a given interval of interest. Thus, where targeting of a particular interval of the wellbore is desired, filtercake breaker materials of the instant disclosure may allow for more complete removal of filtercakes and reduce formation damage that may result in the creation of fluid loss zones.

In one or more embodiments, filtercake breaker compositions in accordance with the present disclosure may include wellbore fluids containing a degradable polymeric breaker that releases acid upon exposure to a number of stimuli that may include changes in temperature and pH or exposure to various solvents. For example, in some embodiments, a degradable polyhydroxycarboxylic acid present as a powder, particulate, or fiber may be used as a delayed filtercake breaker that slowly hydrolyzes and releases acidic byproducts that dissolve or degrade acid-soluble components in the filtercake. After a sufficient amount of time, the released acids may degrade filtercake to such an extent that the filtercake may be removed by pumping or washing the degraded filtercake residue from the well.

Filtercake breaker compositions in accordance with the present disclosure may also be used in conjunction with sand control methods such as gravel packing that involve the use of sand screens and other hardware. For example, a sand control screen assembly may be emplaced within a selected depth within an uncased section of the wellbore to facilitate a gravel packing operation. Gravel packing may then involve mixing gravel with a carrier fluid, and pumping the slurry down the tubing and through a cross-over and into an annulus created between an emplaced screen and an uncased interval of the wellbore. The carrier fluid in the slurry may then leak off into the formation and/or through the screen. The screen may prevent the gravel and other materials in the slurry from entering the production tubing, causing gravel and other additives to deposit in the annulus around the screen and forming the gravel pack. The gravel pack then serves to prevent sand and other formation fines from flowing into the wellbore.

In particular embodiments, the polyhydroxycarboxylic acid may be added to a gravel pack fluid in place of gravel and pumped downhole to fill the annular space between the production screen and formation. In yet other embodiments, polymeric hydroxycarboxylic acid may be combined with a gravel packing material such as bauxite, ceramic materials, glass materials, sand, polytetrafluoroethylene materials, nut shell pieces, cured resinous particulates, nut shell pieces, seed shell pieces, fruit pit pieces, cured resinous particulates comprising fruit pit pieces, wood, composite particulates, carbons, metal oxides, and the like.

Embodiments directed to gravel packing methods may encompass both open-hole and cased-hole operations. For instance, in an open-hole completion, a gravel pack in accordance with the present disclosure may be positioned between the wall of the wellbore and a sand screen that surrounds a perforated base pipe. In a cased-hole completion, a gravel pack in accordance with the present disclosure may be positioned between a perforated casing string and a sand screen that surrounds a perforated base pipe.

Polyhydroxycarboxylic Acids

Filtercake breaking agents in accordance with the present disclosure may be polyesters produced from the polymerization of hydroxycarboxylic acids. Polyhydroxycarboxylic acids are unique in that, upon exposure to an appropriate stimulus, the polyacid hydrolyzes and releases acidic monomers that decrease the pH of the surrounding medium, which may find particular use in the removal of filtercakes prior to the initiation of production.

The hydroxycarboxylic acid breakers in accordance with the present disclosure may be produced through condensation polymerization methods known in the art. In one embodiment, self-polymerization can be initiated by heating a monomer to a temperature above the melting point of the polymeric form, which promotes a condensation reaction that produces water as the polymer forms. The hydroxycarboxylic acid may be added to the gravel pack during the process of gravel packing. Thus, the hydroxycarboxylic acid may be emplaced into the wellbore in combination with the gravel pack.

During use, polyhydroxycarboxylic acids may then slowly hydrolyze and release an acidic byproduct once dispersed in a wellbore fluid or solvent containing water. Polymer hydrolysis may depend on a number of factors that include temperature, solubility of the polymer and released monomer, molecular weight of the polymer, the presence of water, and the ionic strength of the wellbore fluid or brine.

Under downhole conditions, the polymeric hydroxycarboxylic acid generates acidic by-products that may react with the acid-soluble and acid-breakable components in the filtercake. The slow release rate of the acidic by-product may require that the well be shut in for a given period of time to complete the dissolution and break-down reaction. In particular embodiments, the rate of hydrolysis of the polymer and the corresponding conversion to free acid may be delayed sufficiently to enable targeted emplacement of the polyhydroxycarboxylic acid in selected intervals without premature and undesirable filtercake removal.

In one or more embodiments, wellbore fluids compositions may contain at least one polyhydroxycarboxylic acid may hydrolyze at temperature of 120° F. (49° C.) or greater. In other embodiments, the polyhydroxycarboxylic acid may hydrolyze at temperatures of 150° F. (66° C.) or greater. In a non-limiting example, polylactic acid converts to the free acid at temperatures within the range of about 150° F. (66° C.) to about 170° F. (77° C.).

Polyhydroxycarboxylic acids in accordance with the present disclosure may be formed from a number of possible monomers that including, but not limited to lactic acid, malic acid, gluconic acid, glycolic acid, citric acid, mandelic acid, saccharic acid, mucic acid, tartaric acid, 3-hydroxybutyric acid, 4-hydroxybutyric acid, 4-hydroxyvaleric acid, 5-hydroxyvaleric acid and 6-hydroxycaproic acid. The monomeric repeating unit may also be derived from a cyclic monomer or cyclic dimer of the respective aliphatic hydroxycarboxylic acid. Examples of these include lactide, glycolide, β-propiolactone, β-butyrolactone, γ-butyrolactone, γ-valerolactone, δ-valerolactone, ε-caprolactone and the like. It is also within the scope of this disclosure that any of the above monomers may be co-polymerized to produce copolymers, block copolymers, or higher order polymers such as terpolymers or quaternary polymers.

In one or more embodiments, the molecular weight of the polyhydroxycarboxylic acid may affect the hydrolysis rates and formation of acid downhole, possibly affecting the rate and effectiveness of the polymer in breaking the filtercake. In some embodiments the weight average molecular weight of the hydroxycarboxylic acid polymer may range from 500 to 10,000,000 Daltons. In other embodiments, the weight average molecular weight may range from 1,000 to 500,000 Daltons; and from 2,000 to 200,000 Daltons in yet other embodiments. In some embodiments, the molecular weight distribution ($M_w/M_n$) of the hydroxycarboxylic acid polymer may range from 1.2 to 5.0. In other embodiments, the molecular weight distribution may range from 2.0 to 4.0; and from 2.3 to 3.5 in yet other embodiments.

In one or more embodiments, a wellbore fluid containing a polymeric hydroxycarboxylic acid may be emplaced within an interval of a wellbore containing a degradable filtercake in order to remove the filtercake. The polymeric hydroxycarboxylic acids disclosed herein may be used to break monovalent salt-based systems, such as FLOPRO® NT, divalent salt-based systems, such as DIPRO™, and reversible oil-based systems such as FAZEPRO™, all of which are commercially available from M-I, L.L.C. (Houston, Tex.). The wellbore fluid may also include water and brines containing various electrolytes and their blends, such as, but not limited to NaCl, KCl, $CaCl_2$, $CaBr_2$, $ZnBr_2$, etc.

In one or more embodiments, wellbore fluids in accordance with this disclosure may contain at least one polyhydroxycarboxylic acid formulated in a wellbore fluid at a percent by weight (wt %) concentration having a lower limit equal or greater than 0.05 wt %, 0.1 wt %, 0.5 wt %, 1 wt %, and 5 wt %, to an upper limit of 0.5 wt %, 1 wt %, 5 wt %, 7 wt %, and 10 wt %, where the wt % concentration of the polyhydroxycarboxylic acid may range from any lower limit to any upper limit. In other embodiments, the polyhydroxycarboxylic acid breaker may be present in a wellbore fluid at a percent by weight of at least 10 wt %.

A polyhydroxycarboxylic acid may be formulated in a wellbore fluid in an amount that ranges from 0.5 ppb to 20 ppb in some embodiments. In some embodiments, the polyhydroxycarboxylic acid breaker may be added in an amount that is at least 15 ppb or at least 18 ppb in other embodiments. In some embodiments, polyhydroxycarboxylic acid may be added to the defluidizing pill in a range of 5 ppb to 20 ppb.

In one or more embodiment, at least one polyhydroxycarboxylic acid hydrolyzes and decreases the pH to a value within the range of less than pH 1 to pH 5. In other embodiments, the pH may range from pH 1 to pH 3.

The three dimensional shape of the polyhydroxycarboxylic acid additive may also be varied to control a number of the rate of dissolution. In some embodiments, the polyhydroxycarboxylic acid may be provided as a particulate or fiber. As used herein, a particulate is a spherical, substantially spherical, or oblate solid prepared from the polymerization of at least one hydroxycarboxylic acid. For example, polyhydroxycarboxylic acid particulates may be a preparation of homogenous polymer solids that are uniform in size or added as a mixture of sizes in other embodiments. Further, polyhydroxycarboxylic acid particulates may be formed from amorphous or crystalline polymer. The average size of the particulate may range from about 1 nm to about 1 mm, or from about 100 nm to about 100 µm in other embodiments.

In one or more embodiments, the polyhydroxycarboxylic acid may be added in the form of a polymeric fiber. Polyhydroxycarboxylic acid fibers in accordance with the instant disclosure may have lengths within the range of 100 µm to 20 mm. In other embodiments the polyhydroxycarboxylic acid fibers may have lengths within the range of 500 µm to 15 mm.

The diameter of the polyhydroxycarboxylic acid fiber may be used to control the extent and rate of dissolution of the fiber, particularly upon exposure to elevated temperature. In embodiments of the instant disclosure, the diameter of the polyhydroxycarboxylic acid fibers may fall within the range of about 0.1 µm to about 60 µm. In yet another embodiment, the diameter of the polyhydroxycarboxylic acid fibers may be within the range of 0.5 µm to 50 µm.

It is further contemplated that polyhydroxycarboxylic acid may be added in various other forms such as, for example, in granular form, a flake material, or the like. The present disclosure also extends to the simultaneous placement of gravel and polyhydroxycarboxylic acid in either granular form or as a flake material.

In one or more embodiments, polyhydroxycarboxylic acid may be mixed with a gravel packing additive at a ratio of percent by weight of polyhydroxycarboxylic acid to gravel additive that may range from about 5:1 to about 1:5. In other embodiments, the ratio of polyhydroxycarboxylic acid to gravel additive that may range from about 3:1 to about 1:1. It is also envisioned that, in some embodiments, that gravel packing operations may be performed using particulate polyhydroxycarboxylic acid and exclude gravel additives. In other embodiments, the polyhydroxycarboxylic acid may hydrolyze at a temperature of 120° F. (49° C.) or greater.

It is further contemplated that gravel packing operations disclosed herein may include an initial gravel pack emplaced for the purposes of sand control with a possible secondary gravel pack emplaced for remedial purposes.

The polyhydroxycarboxylic acid, when emplaced with the gravel pack, may dissolve in the wellbore. Thus, a consolidated gravel pack may be maintained since the dissolved polyhydroxycarboxylic acid particles (e.g., fibers, particulates, flakes, etc.) do not create void spaces. Rather, the polyhydroxycarboxylic acid particles are packed within pores in the gravel and when dissolved, degrade the filtercake.

EXAMPLES

The following examples are included to demonstrate embodiments of the present disclosure. It should be appreciated by those of skill in the art that the techniques and compositions disclosed in the examples which follow represent techniques discovered to function well in the practice of the disclosure, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the disclosure.

The data below discusses methods of using a polylactic acid (PLA) additive to filtercakes generated by water-based drilling fluids. In the following demonstration of the viability of this approach, a polyhydroxycarboxylic acid breaker formulation degrades filtercakes produced using water-based drilling fluids FLOPRO NT and DIPRO systems.

Example 1.1

The 9.5 ppg FLOPRO NT system was formulated as shown in Table 1. FLOPRO NT is a conventional polymer carbonate reservoir drill-in system consisting of primarily acid-soluble components, where FLO-VIS PLUS is a clarified xanthan gum viscosifier, FLOTROL is a derivatized starch fluid loss additive, SAFE-CARB is a sized ground calcium carbonate, D-STROYER is an internal filtercake breaker, and SAFE-SCAV NA is an oxygen scavenger, all of which are commercially available from MI-SWACO L.L.C. (Houston, Tex.). X-CIDE 102 is a glutaraldehyde additive commercially available from Baker Hughes (Houston, Tex.).

TABLE 1

Wellbore fluid formulations for Example 1

| Products | Concentration (lb/bbl) |
|---|---|
| Water | 311.49 |
| KCl | 28.85 |
| FLO-VIS PLUS | 1.00 |
| Soda Ash | 0.15 |
| FLOTROL | 8.00 |
| X-CIDE 102 | 0.20 |
| SAFE-CARB 2 | 5.00 |
| SAFE-CARB 10 | 5.00 |
| SAFE-CARB 20 | 5.00 |
| SAFE-CARB 40 | 23.00 |
| SAFE-CARB 250 | 7.00 |
| D-STROYER | 1.00 |
| SAFE-SCAV NA | 0.15 |

After formulation, the wellbore fluid's rheology at 120° F. was studied and the sample was hot rolled to measure the stability of the fluid over time. Following hot rolling, the rheology of the fluid was again measured. Results are shown in Table 2.

TABLE 2

Rheological measurements for the wellbore fluid of Example 1 at 120° F.

| Fann Dial Reading | Before Hot Roll | After Hot Roll |
|---|---|---|
| 600 rev/min | 57 | 53 |
| 300 rev/min | 42 | 38 |
| 200 rev/min | 36 | 32 |
| 100 rev/min | 29 | 25 |
| 6 rev/min | 14 | 11 |
| 3 rev/min | 12 | 9 |
| Gels 10"/10' | 13/15 | 10/13 |
| Brookfield Reading (cP) | | |
| LSRV 1 minute | — | 22,895 |
| LSRV 2 minute | — | 23,095 |
| LSRV 3 minute | — | 22,795 |

To evaluate the effects of the polylactic acid (PLA) fibers on filtercake clean up, the test procedure below was used. The test equipment and materials used are considered typical for those who are skilled in the art. A filtercake was built on a water-saturated ceramic disk having an average 5-micron pore opening size in a double-ended high temperature high pressure fluid loss cell by pressing the reservoir drilling fluid against the ceramic disk with about 300 psi nitrogen differential pressure at about 60-82° C. 140° F.-180° F.) for approximately 16 hours. Samples were then transferred to a cell and a filtercake was built. Spurt loss of the fluid was then measured. Results are show in Table 3.

TABLE 3

Spurt loss for fluid compositions assayed in Example 1 Modified HTHP (FAO-10 Disc) @ 150° F.

| | |
|---|---|
| Spurt | 5.8 mL |
| 1 minute | 6.0 mL |
| 2 minute | 6.4 mL |
| 4 minute | 6.8 mL |
| 9 minute | 7.6 mL |
| 16 minute | 8.4 mL |
| 25 minute | 9.2 mL |
| 30 minute | 9.6 mL |
| 36 minute | 9.8 mL |

Next, the PLA additive was prepared as a slurry in brine at 3 lb/bbl in 8 oz. jars. The filtercake prepared above was then transferred to the jar by placing the filtercake-covered aloxite disk into the jar for observation. Gravel was mixed with the PLA additive and placed upon the filtercake. The filtercake was then placed in an oven at 170° F. (77° C.) and observed at regular intervals to qualitatively measure filtercake degradation and/or removal. After 72 hours, the FLOPRO filtercake was significantly degraded and nearly completely dissolved.

Example 1.2

The 14.0 ppg DIPRO system was formulated as shown in Table 4. DIPRO is a biopolymer free system including a complex starch and calcium carbonate.

TABLE 4

Wellbore fluid formulations for Example 1.2.

| Products | Concentration (lb/bbl) |
|---|---|
| DI-TROL | 8.00 |
| DI-BALANCE | 1.00 |
| 14.2 lb/gal Calcium Bromide | 498.47 |
| Brine Water | 35.96 |
| SAFE-CARB 2 | 5.00 |
| SAFE-CARB 10 | 5.00 |
| SAFE-CARB 20 | 5.00 |
| SAFE-CARB 40 | 23.00 |
| SAFE-CARB 250 | 7.00 |

After formulation, the wellbore fluid's rheology was studied and the sample was hot rolled to measure the stability of the fluid over time. Following the hot rolling, the rheology of the fluid was again measured. Results are shown in Table 5.

TABLE 5

Rheological measurements for the wellbore fluid of Example 2

| Fann Dial Reading | Before Hot Roll | After Hot Roll |
|---|---|---|
| 600 rev/min | 73 | 75 |
| 300 rev/min | 48 | 49 |
| 200 rev/min | 38 | 39 |
| 100 rev/min | 27 | 28 |
| 6 rev/min | 10 | 8 |
| 3 rev/min | 8 | 7 |
| Gels 10"/10' | 6/8 | 5/6 |
| Brookfield Reading (cP) | | |
| LSRV 1 minute | — | 14,997 |
| LSRV 2 minute | — | 16,496 |
| LSRV 3 minute | — | 17,196 |

Samples were then transferred to a cell and a filtercake was created. Spurt loss of the fluid was then recorded as shown below in Table 6.

TABLE 6

Spurt loss for fluid compositions
assayed in Example 1
Modified HTHP (FAO-10 Disc) @ 150° F.

| | |
|---|---|
| Spurt | 3.4 mL |
| 1 minute | 3.6 mL |
| 2 minute | 3.8 mL |
| 4 minute | 4.0 mL |
| 9 minute | 4.3 mL |
| 16 minute | 4.6 mL |
| 25 minute | 5.0 mL |
| 30 minute | 5.2 mL |
| 36 minute | 5.4 mL |

Next, the PLA additive was prepared as a slurry in brine at 3 lb/bbl in 8 oz. jars. The filtercake prepared above was then transferred to the jar by placing the filtercake-covered aloxite disk into the jar for observation. The filtercake was then placed in an oven at 170° F. (77° C.) and observed at regular intervals to qualitatively measure filtercake degradation and/or removal.

The DIPRO filtercake appeared to completely dissolve, which was expected because it did not contain the biopolymer viscosifier. In both samples 1.1 and 1.2, a portion of the fibrous polymeric breaker appeared to float at the top of the solution. However, it is clear from the observed dissolution of the filtercakes that this did not substantially affect the overall efficiency of the PLA additive. Both of the above described systems are water-based, but a reversible invert emulsion system such as FAZEPRO, for example, may also be compatible.

Example 2

In the following example, two filtercakes were prepared as described above for Example 1.1. The first sample was soaked in 11 ppg calcium chloride and the second in 14 ppg calcium bromide. A second pair of filtercakes was prepared as described above for Example 1.2, one in 9 ppg potassium and the second in 12 ppg sodium bromide.

The filtercakes were placed face down in a slurry of gravel and polylactic acid fibers. The samples were then incubated at 170° F. (77° C.) and monitored. Observations were made at 48 hours and then after 192 hours (7 days). All samples showed sufficient degradation. The calcium bromide samples appeared to react the most quickly and since no filtercake was evident after 48 hours both samples were removed from the soak observations at that point. While some of the PLA additive floated to the top in the samples, portions were retained within the gravel itself. After 7 days, the remaining calcium chloride samples were removed from solution and it was observed that the filtercake had completely dissolved.

At the proper temperature range, polyhydroxycarboxylic acids demonstrate the potential to function as a breaker additive to aid in filtercake dispersion or total dissolution and may be added as part of a breaker fluid composition or in combination with gravel during gravel packing operations.

While the disclosure has presented a limited number of embodiments, those skilled in the art, having benefit of this disclosure, will appreciate that other embodiments can be devised which do not depart from the scope of the disclosure as presented herein. Moreover, embodiments described herein may be practiced in the absence of any element that is not specifically disclosed herein. Accordingly, the scope of the disclosure should be limited only by the attached claims.

What is claimed:

1. A method comprising:
    drilling at least one interval of a wellbore with a water-based wellbore fluid, wherein the water-based wellbore fluid produces a filtercake in the at least one interval of the wellbore;
    gravel packing an interval of a wellbore traversing a subterranean formation with a gravel pack comprising polyhydroxycarboxylic acid, wherein the polyhydroxycarboxylic acid is a polymer formed from one or more monomers selected from a group consisting of malic acid, lactic acid, gluconic acid, citric acid, mandelic acid, saccharic acid, mucic acid, and tartaric acid, wherein the polyhydroxycarboxylic acid hydrolyzes at a temperature ranging from about 150° F. to about 170° F.;
    hydrolyzing the polyhydroxycarboxylic acid; and
    degrading at least a portion of the filtercake.

2. The method of claim 1, wherein the ratio of the polyhydroxycarboxylic acid to gravel in the gravel pack ranges from about 5:1 to 1:5 by total weight.

3. The method of claim 1, wherein the polyhydroxycarboxylic acid hydrolyzes and decreases the pH of the gravel pack to a value within a range of pH 1 to pH 5.

4. The method of claim 1, wherein the polyhydroxycarboxylic acid is emplaced in the wellbore in combination with the gravel pack.

5. The method of claim 1, wherein the polyhydroxycarboxylic acid is present as a polyhydroxycarboxylic acid fiber.

6. The method of claim 5, wherein the polyhydroxycarboxylic acid fiber has a length within the range of 100 μm to 20 mm.

7. The method of claim 1, wherein the polyhydroxycarboxylic acid is added at a concentration that ranges from about 0.5 ppb to 15 ppb.

8. A method comprising:
    running a sand control screen assembly to a selected depth within the uncased section of the wellbore to facilitate a gravel packing operation; and
    introducing a gravel pack slurry comprising polyhydroxycarboxylic acid into the wellbore to facilitate gravel packing operations, wherein the polyhydroxycarboxylic acid is a polymer formed from one or more monomers selected from a group consisting of malic acid, lactic acid, gluconic acid, citric acid, mandelic acid, saccharic acid, mucic acid, and tartaric acid, wherein the polyhydroxycarboxylic acid hydrolyzes at a temperature ranging from about 150° F. to about 170° F.

9. The method of claim 8, wherein the polyhydroxycarboxylic acid is emplaced in the wellbore in combination with the gravel pack slurry.

10. The method of claim 8, wherein the ratio of the polyhydroxycarboxylic acid to gravel additive ranges from about 5:1 to 1:5 by total weight.

11. The method of claim 8, wherein the polyhydroxycarboxylic acid is added at a concentration that ranges from about 0.5 ppb to 15 ppb.

12. The method of claim 8, wherein the polyhydroxycarboxylic acid is present as a polyhydroxycarboxylic acid fiber.

13. The method of claim 12, wherein the polyhydroxycarboxylic acid fiber has a length within the range of 100 μm to 20 mm.

14. The method of claim 8, wherein the polyhydroxycarboxylic acid is present as a polyhydroxycarboxylic acid particulate.

* * * * *